United States Patent [19]

Veltman

[11] Patent Number: 5,385,473
[45] Date of Patent: Jan. 31, 1995

[54] DISPLAY POLYHEDRA HAVING MARKED AND UNMARKED PAIRED OPPOSING FACES

[75] Inventor: John Veltman, Velarde

[73] Assignee: Cuisenaire Company of America, Inc., White Plains, N.Y.

[21] Appl. No.: 145,998

[22] Filed: Nov. 1, 1993

[51] Int. Cl.⁶ .............................................. G09B 19/02
[52] U.S. Cl. ................................. 434/205; 434/208; 434/403; 273/146
[58] Field of Search ............... 434/205, 208, 211, 191, 434/188, 314, 403; 273/146; 40/427

[56] References Cited

U.S. PATENT DOCUMENTS 4,465,279  8/1984  Larson .................................. 273/146

FOREIGN PATENT DOCUMENTS 0510065  2/1955  Canada ................................ 273/146
2419090  11/1979  France ................................ 273/146
2465504  4/1981  France ................................ 273/146
2838478  5/1980  Germany ............................ 273/146
0588253  5/1977  Switzerland ....................... 273/146

*Primary Examiner*—Gene Mancene
*Assistant Examiner*—Jeffrey A. Smith
*Attorney, Agent, or Firm*—Kane, Dalsimer, Sullivan, Kurucz, Levy, Eisele and Richard

[57] ABSTRACT

A polyhedra for emulating an object or other phenomena with marked surfaces, includes a plurality of faces, some with markings and some being blank. The surfaces are arranged about the polyhedra so that each marked face is opposite a blank face. The polyhedra may be used for conducting and/or demonstrating the principles of probability in conjunction with a projection device.

8 Claims, 2 Drawing Sheets

DISPLAY POLYHEDRA HAVING MARKED AND UNMARKED PAIRED OPPOSING FACES

BACKGROUND OF THE INVENTION

1. Field of Invention

This invention pertains to a device useful in conjunction with teaching aids, and more particularly to a device useful as a teaching aid for demonstrating probability theory in conjunction with an illuminating device such as an overhead projector.

2. Background of the Invention

Overhead projectors constitute a particular type of teaching aid very useful for displaying various information to a large number of students. Typically the displayed information, including text, pictures, drawings, graphs and so on is first transposed to a transparent sheet. Alternatively the lecturer can draw various figures or make notes directly on a blank transparent sheet. The image from the sheet is then projected unto a screen by the projector. In some instances, a direct demonstration using actual objects or models rather than pictures or drawings is more effective.

A very effective teaching aid for teaching probability is a die or pair of dice. However because most dice, models or similar teaching aids are opaque and because the overhead projector displays a two dimensional image, demonstrations making use of actual dice, models or similar objects cannot be made using an overhead projector. Alternatively, if a transparent model is used, the indicia on one face will interfere with the indicia on the face directly opposite when placed on the projector.

OBJECTIVES AND SUMMARY OF THE INVENTION

In view of the above-mentioned disadvantages of the prior art, it is an objective of the present invention to provide a three dimensional object useful for demonstrations in conjunction with an overhead projector.

A further objective is to provide a polyhedra shaped and constructed to emulate an object such as a die used to demonstrate the laws of probability.

Other objectives shall become apparent from the following description. Briefly, the present invention concerns a polyhedra having a plurality of faces, some being marked with indicia and some being blank. The faces are arranged about the polyhedra such that a face with indicia is always opposite a blank face. The polyhedra is made of a transparent material so that when it is rolled on the display surface of an overhead projector, an image of it, including its faces is projected on a screen.

DETAILED DESCRIPTION OF THE INVENTION

Figure 1:
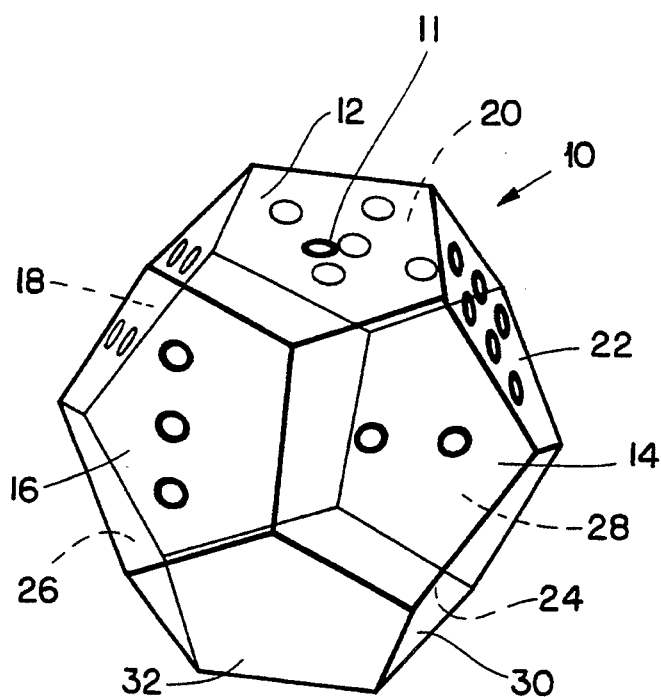
FIG. 1 shows an orthogonal view of a polyhedra constructed in accordance with this invention.
Figure 2:
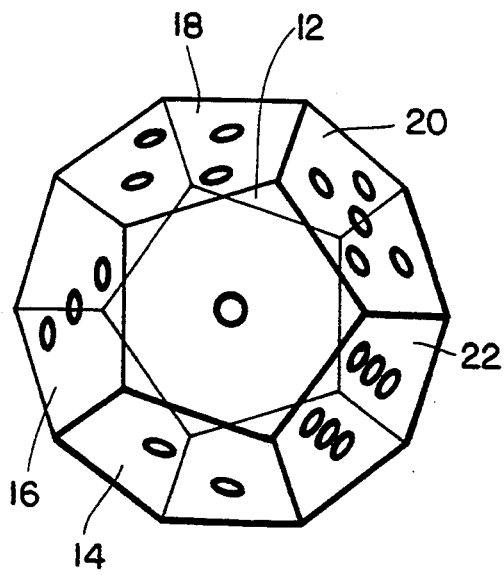
FIG. 2 shows a top view of the polyhedra of FIG. 1.
Figure 3:
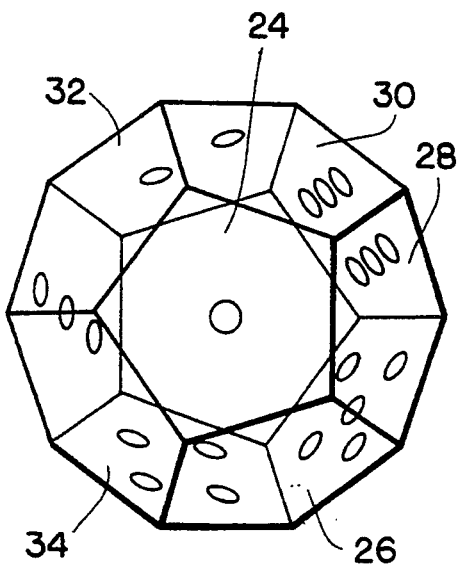
FIG. 3 shows a bottom view of the polyhedra of FIG. 1.

Referring now to the drawings, in FIGS. 1-3 a polyhedra 10 is shown constructed in accordance with this invention. The polyhedra 10 is preferably made of a transparent material such as plastic, glass and so on and it can be solid or it can be hollow. Preferably the polyhedra is in the shape of a regular polyhedra having a number of faces having geometric shapes. The faces may be identical. The number of faces can be changed depending on the demonstration. Preferably at least half of the faces of polyhedra 10 are blank, i.e. they have no markings of any kind. The remaining faces are marked with various indicia as desired.

For example, the polyhedra 10 in the Figures is constructed and arranged to emulate a die used to demonstrate probability. A regular die is a cube having six square surface, each surface having from one to six dots. (In the Figures, for the sake of clarity the faces and dots which are visible directly are shown in heavy lines, while the faces and dots which are visible through the polyhedra are shown with light lines). These six surfaces are represented on polyhedra 10 by six pentagonal faces 12, 14, 16, 18, 20, 22. Face 12 has one dot 11. The other faces have two, three, four, five and six dots respectively. The remaining faces 24, 26, 28, 30, 32 and 34 are blank. Importantly each face with an indicia is disposed opposite, i.e. it is in parallel with, a blank face. For example face 12 is opposed to face 24, face 14 is opposed to face 26 and so on. In the Figures, all the faces with indicia are clustered together or adjacent to each other. More particularly, as seen in FIG. 1, all the faces 12-22 with indicia are disposed on the top half of the polyhedra 10 while the faces 24-34 without indicia are disposed on the bottom. However any other arrangement will work as well as long as a face indicia is opposite to the blank face.

Figure 4:
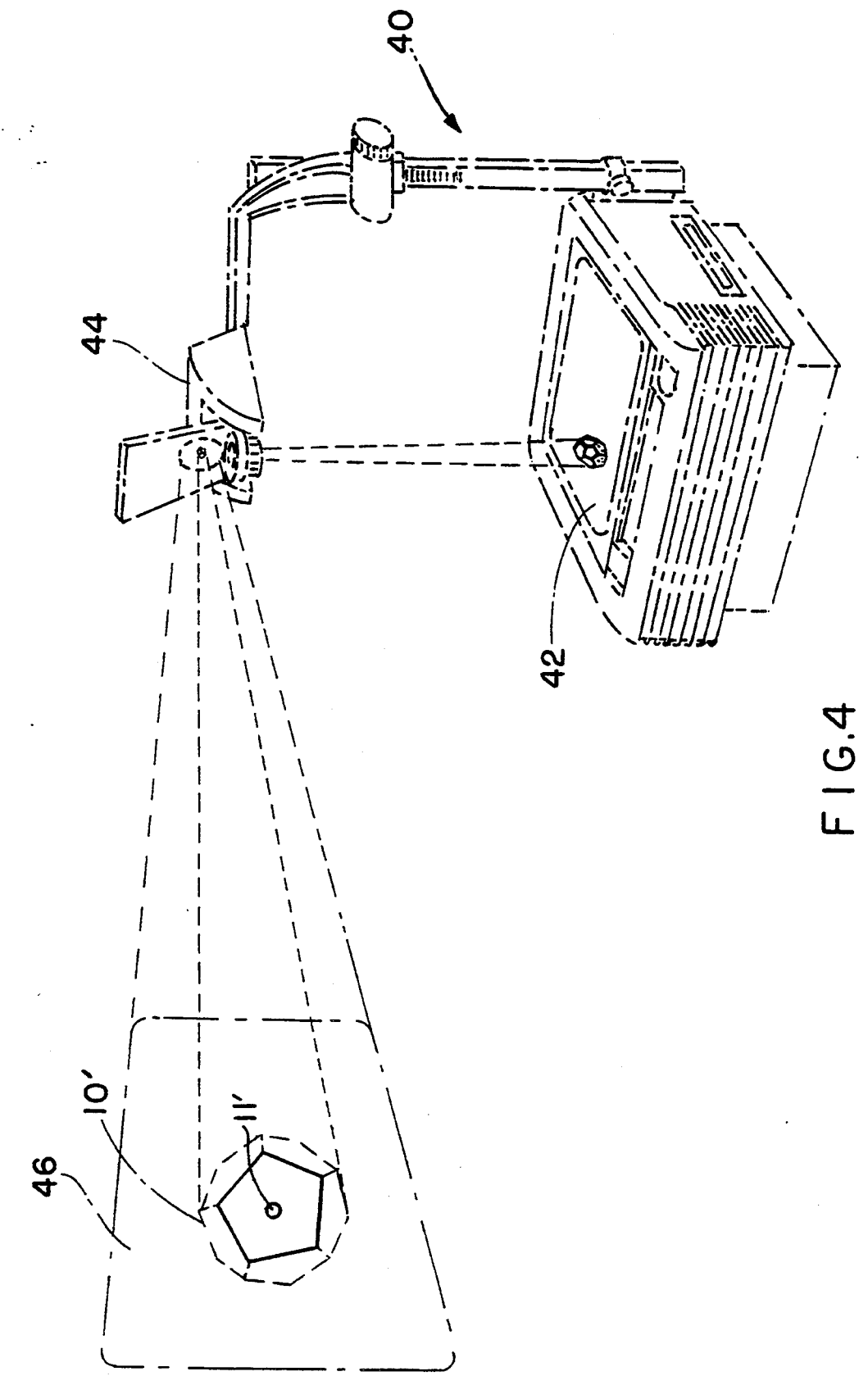
FIG. 4 shows the polyhedra of FIGS. 1-3 and its image as displayed by an overhead projector.

The polyhedra 10 is used preferably in conjunction with an illumination device such as an overhead projector 40 as shown in FIG. 4. In this figure, projector 40 includes a display surface 42 disposed on top of a strong light source (not shown). Above surface 42 a mirror and lens arrangement 44 is used to project the image from surface 42 on a screen 46. In order to demonstrate the laws of probability a lecturer throws polyhedra 10 randomly on surface 42. An image of the polyhedra 10 is seen by the students on screen 46. When the polyhedra comes to rest on surface 42 its image 10' will show in the center a face with one or more dots. For example if the polyhedra comes to rest with face 12 on top, the center of image 10' shows a single dot 11' because the polyhedra 10 is illuminated from the bottom through face 24 which is blank. Importantly, approximately the same image 10' will appear on the screen 46 even if the polyhedra comes to rest with face 24 on top because dot 11 is now directly underneath face 24 and is projected through face 24 onto screen 46. Since a standard die has six faces, the probability of getting any given number of dots, for example a 'one' on its top face is 1:6. Polyhedra 10 has twelve faces. With polyhedra 10, as seen on screen 46, since a face with dots is seen either when the face is on top or the bottom, the probability of getting a given number of dots 2:12 is the same as 1:6. Therefore the polyhedra 10 accurately simulates a standard die.

The indicia used on the faces can be any pictures, colors, geometric figures or combinations thereof. Similarly the number of faces on polyhedra 10 can be selected to equal an even multiple of surfaces of other simulated objects and/or phenomena. For example a coin with two faces can be simulated with a polyhedra having eight faces, i.e. a octahedra.

Obviously, other modifications may be made to the invention without departing from its scope as defined in the appended claims.

I claim:

1. A polyhedra comprising:
a transparent body defined by a plurality of faces including a first set of faces bearing indicia, and a second set of faces, said first and second sets of faces being in one-to-one correspondence and each face of said second set being blank and being disposed opposite a corresponding first set face whereby indicia on a face of said first set may be viewed through a corresponding face of the second set.

2. The polyhedra of claim 1 wherein said body has the shape of a regular polyhedra.

3. The polyhedra of claim 2 wherein said first set of faces bear indicia of the numerals one through six in the format of a die.

4. A polyhedra for emulating an object having a number of surfaces, said polyhedra being adapted for use in conjunction with a projection device for projecting an image simulative of said object, said polyhedra comprising:
a body made of a transparent material and being defined by a plurality of planar faces, wherein the number of faces is equal to twice the number of surfaces, wherein said faces are partitioned into a first set of faces having indicia and a second set of faces having no indicia, each face of said first set being disposed opposite a face of said second set.

5. The polyhedra of claim 4 wherein said face of said first set and said face of second set are disposed in parallel, 6. The polyhedra of claim 5 wherein said faces are regular polygons.

7. The polyhedra of claim 4 wherein said body is in the shape of a regular polyhedra.

8. The polyhedra of claim 7 wherein said first set of faces bear indicia of the numerals one through six in the format of a die.

* * * * *